Oct. 20, 1970 — S. E. CHOCHOLEK — 3,534,633
DIFFERENTIAL WITH OUTPUT TORQUE DISTRIBUTION CONTROL
Filed Sept. 9, 1968 — 4 Sheets-Sheet 4
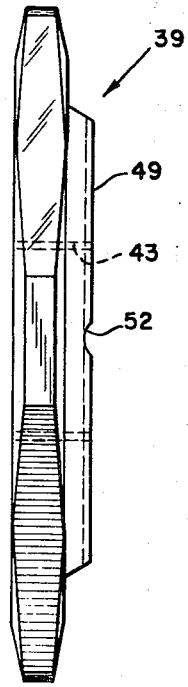
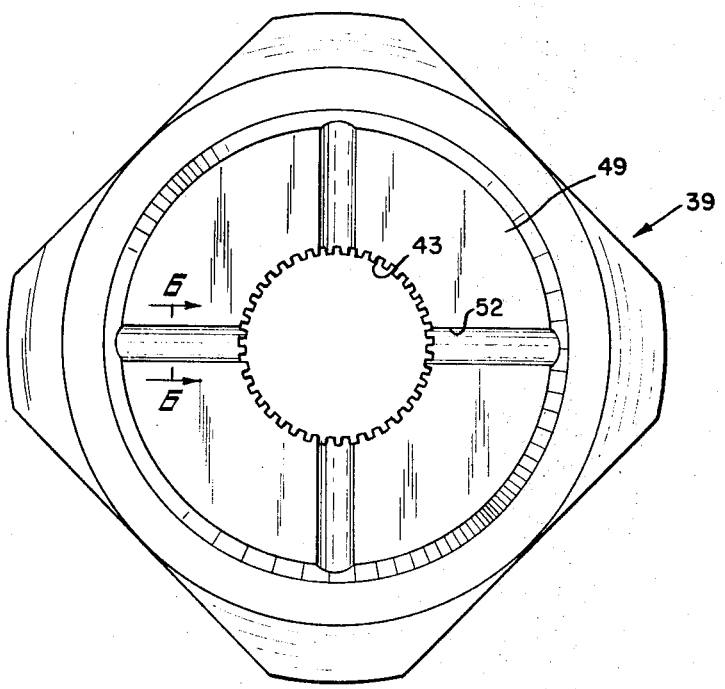
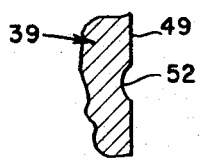
*INVENTOR.*
STANLEY E. CHOCHOLEK
BY
ATTORNEYS United States Patent Office 3,534,633
Patented Oct. 20, 1970

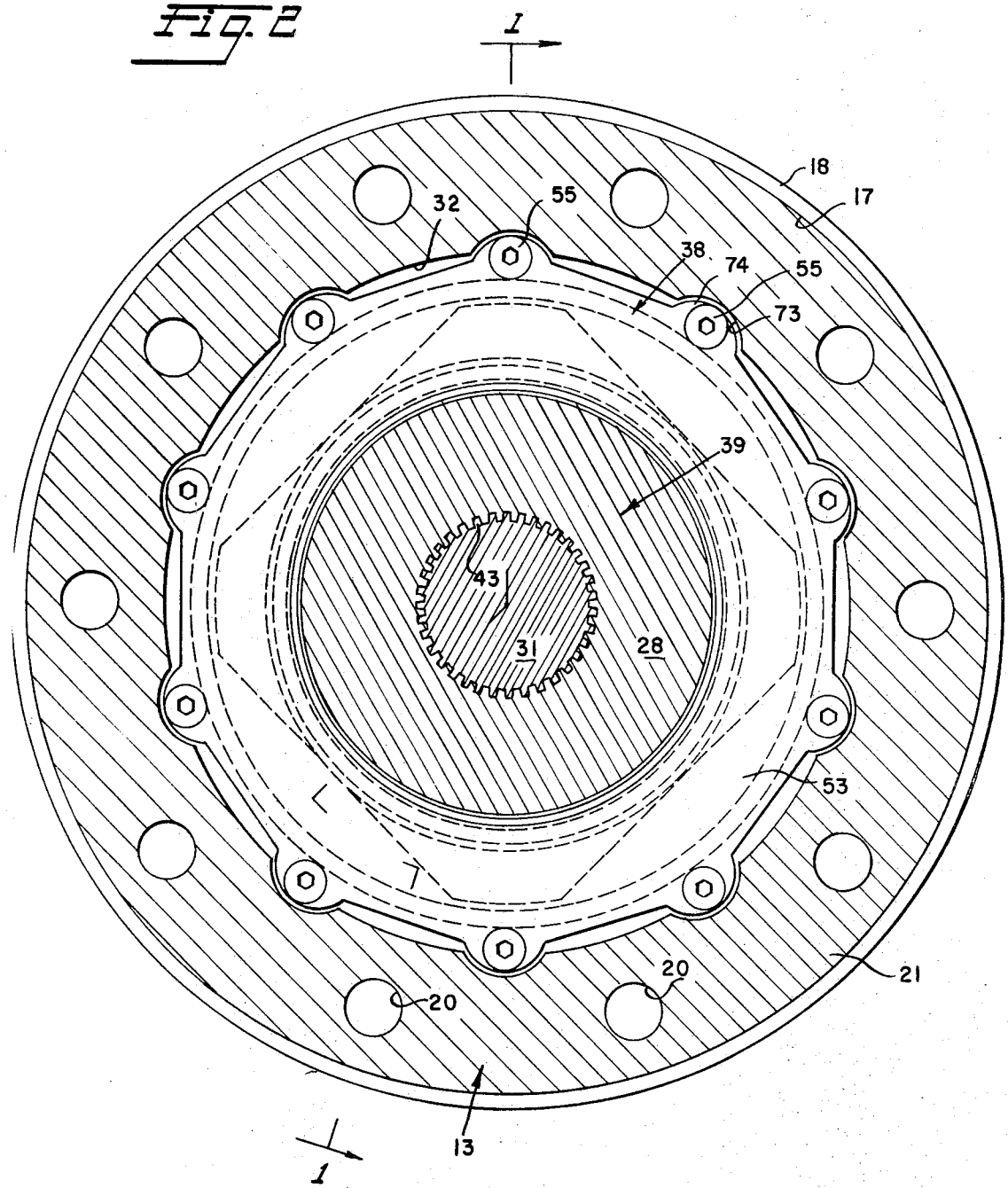

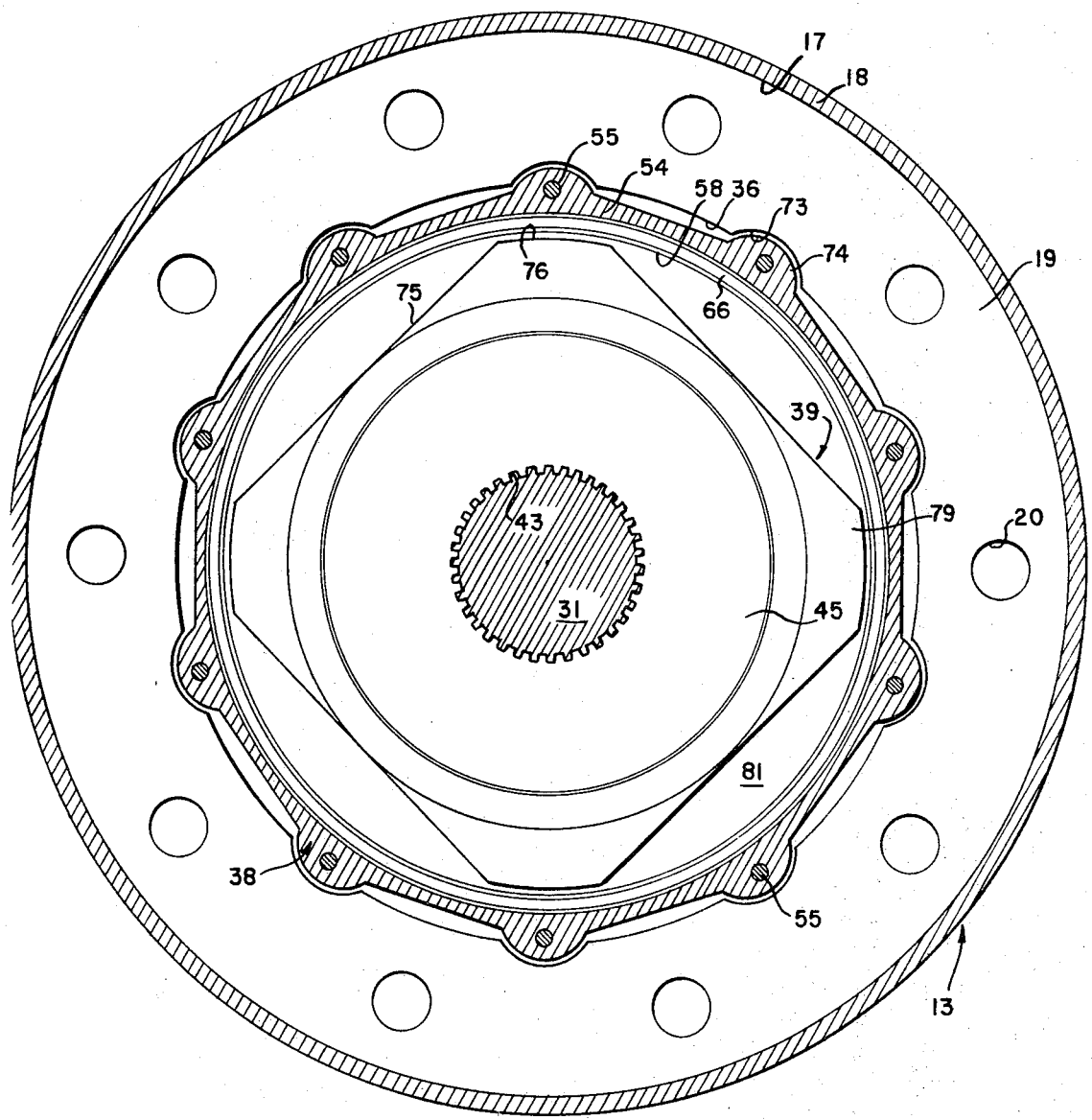

1

3,534,633
DIFFERENTIAL WITH OUTPUT TORQUE DISTRIBUTION CONTROL
Stanley E. Chocholek, Orchard Lake, Mich., assignor, by mesne assignments, to Rockwell-Standard Company, Pittsburgh, Pa., a corporation of Delaware
Filed Sept. 9, 1968, Ser. No. 758,345
Int. Cl. F16h 1/44
U.S. Cl. 74—711                            9 Claims

ABSTRACT OF THE DISCLOSURE

An automotive drive axle comprises a differential casing rotatably mounted on an axle housing and includes an input drive connection to drive the casing and rotatable output members connected to be differentially driven by the casing. An impeller is rotatable with one of the output members, and an annular housing non-rotatably connected to the differetial casing peripherally envelopes the impeller in slidable fluid tight sealed engagement with the impeller. Viscous elastic plastic material, preferably silicone putty, in the housing resists relative movement between the housing and the impeller.

BACKGROUND AND SUMMARY OF INVENTION

The invention herein relates to automotive differential mechanisms wherein provision is made for improved distribution of output torque particularly under adverse traction conditions. For example, the usual automotive drive axle differential has its output connected to axle shafts leading to ground engaging wheels. When the wheels on one side lose traction, as by encountering ice, mud, sand or like slippery or loose material surfaces, all of the torque is diverted to spinning those wheels with the result that no torque is transmitted to the other wheels and the vehicle becomes stalled. Similarly, when there is any nonuniform traction at different wheels, there is a non-uniform unpredictable distribution of torque from the differential often resulting in dangerous driving conditions.

Many solutions to this problem have been proposed. The most drastic is possibly a manually controlled positive clutch arrangement that locks out the differential, that is it solidly connects the axle shafts for rotation together so that equal torque is applied to both. These devices require driver attention and judgment and are often misused during fairly normal drive conditions and may not be brought into use when emergency conditions arise otherwise requiring driver attention.

Devices have been proposed which permit normal differential action within certain ranges and then lock out the differential when loss of traction occurs at either wheel in an automotive drive axle assembly. One of these involves special gearforms, but this is not adequate where one of the wheels loses all traction. A mechanical control arrangement for this purpose which has proved to be of merit is that disclosed in Brownyer Pat. No. 3,390,-593 issued July 2, 1968. This arrangement uses multiple disc spring and friction clutch arrangements requiring many parts, and the clutch while infrequently operated may wear or malfunction, especially if improperly installed or maintained in adjustment.

The invention contemplates control of the torque distributed to the output shafts of a differential by means of a special viscous material filled retardation device that automatically becomes effective upon unequal speeds of the output shafts. Devices of this general type have been proposed as disclosed in Ransom Pat. No. 2,743,792 issued May 1, 1956 wherein resistance to unequal shaft speed is provided by shear action of liquid between relatively rotatable large area plates. The liquids proposed are oils such as silicon oils, glycerine and heavy petroleum oils. The Ransom device requires rather accurate machining to match the opposing plate surfaces, and special grooving is required to produce a pumping action to circulate the oil for replenishing the oil film after shearing by relative rotation of the plates. This device also presented oil leakage problems.

The foregoing proposals and others in the prior art have mainly proved to be relatively expensive and subject to various operational limitations, so that the problem found no ultimate solution prior to the invention. The invention provides an improved arrangement wherein an impeller rotating with one output shaft of the differential is disposed in a body of elastic plastic viscous material such as silicone putty contained in a housing that normally rotates with that shaft and the differential mechanism support during normal traction conditions but undergoes relative rotation with respect to the shaft when adverse traction conditions are encountered, and this is the major object of the invention.

A more specific object of the invention is to provide a novel drive axle differential assembly of the type wherein the differentiating mechanism is contained in a rotatable cage or like support case driven from an input shaft, and there are two output shafts at least one of which carries an impeller peripherally slidably enclosed in an annular housing that rotates with the support case and one output shaft during normal traction and vehicle steering conditions and is non-rotatably connected to the support case to become automatically effective to resist uncontrolled drive torque when one or the other of the ground engaging wheels loses traction.

The differential assembly of the invention may also be employed as an interaxle differential between the drive axles of a tandem axle assembly to equalize the distribution of torque to the respective axle units.

BRIEF DESCRIPTION OF DRAWINGS

FIG. 2 is an end view in section substantially on line 2—2 of FIG. 1 showing the retarding device;

FIG. 3 is an end view in section substantially on line 3—3 of FIG. 4 showing the impeller and the interior of the retarding device;

FIG. 4 is a side elevation showing the retarding device impeller apart from the assembly;

FIG. 5 is an end view of the impeller showing the surface grooves; and

FIG. 6 is an enlarged fragmentary section on line 6—6 of FIG. 5 showing the groove contour.

PREFERRED EMBODIMENTS

Figure 1:
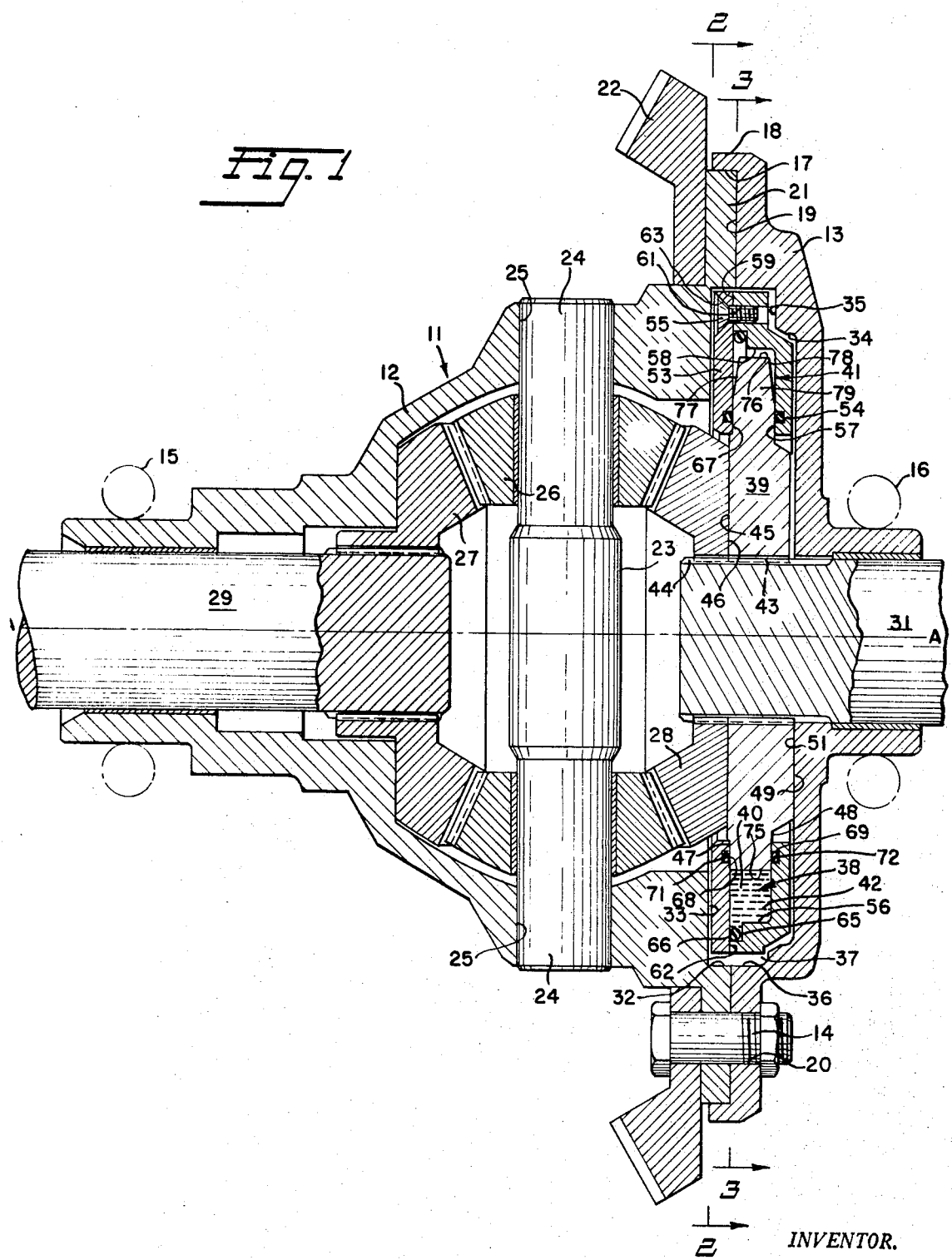
FIG. 1 is a side elevation partly in section substantially on line 1—1 of FIG. 2 showing an axle differential mechanism assembly incorporating a preferred embodiment of the invention.

The invention is disclosed for its preferred environment as incorporated in the differential mechanism assembly of the drive axle of an automotive vehicle, for controlling the relative torque effective on opposed axle shafts connected to ground engaging wheels.

FIG. 1 shows a differential carrier or case 11 consisting essentially of two casing parts 12 and 13 rigidly secured together by a circumferential row of bolts 14. Within the axle housing (not shown) case 11 is supported for rotation about an axis A—A by suitable bearing assemblies indicated at 15 and 16.

Casing part 13 is formed with an outer recess 17 bordered by an outer rim 18 and having a flat axial face 19 disposed at right angles to axis A—A. Casing part 12 has an end flange 21 seated with a rabbit joint fit in recess 17. A bevel ring gear 22 which is driven from the vehicle power plant by suitable transmission mechanism (not shown) is also secured to case 11 by bolts 14 extending through apertures 20.

Within case 11 is mounted the usual differential spider 23 having cross arms 24 extending into case bores 25 and rotatably mounting bevel pinions 26. Pinions 26 are all meshed with opposite bevel side gears 27 and 28 suitably independently rotatably mounted in case 11 for rotation about axis A—A and drive connected to axle shafts 28 and 31 leading to the vehicle wheels (not shown).

The foregoing structure is essentially conventional drive axle structure and in practice all of the described parts are preferably conventional except for modification of casing part 13 as will appear.

Casing part 12 radially inwardly of flange 21 is formed with an axial recess defined by a cylindrical surface 32 and a flat face 33 perpendicular to axis A—A. Casing part 13 is formed with an axially open recess 34, the axially inner portion of which is enlarged and defined by a flat face 35 perpendicular to axis A—A and surrounded by a cylindrical surface 36 equal in diameter to surface 32 and comprising a substantial continuation thereof in the assembly. Thus the casing parts are internally formed to define a space 37 therebetween, and in the invention this space accommodates a retardation device 38 for controlling the relative torque applied to the respective axle shafts 29 and 31.

Retardation device 38 comprises an impeller 39 in the form of a flat plate secured non-rotatably to axle shaft 31, and a surrounding annular sealed housing 41 mounted about and enclosing the periphery of the impeller and non-rotatably connected to the differential case 11. The housing space 40 between the impeller and the housing is filled with a suitably viscous elastic plastic material indicated at 42 resisting relative rotation of the differential case and shaft 31.

Impeller 39 has a central longitudinally splined bore 43 by which it is non-rotatably mounted on a splined end section 44 of shaft 31, and it has an inner smooth flat face 45 in snug abutment with the flat back face 46 of side gear 28 to restrict movement to the left in FIG. 1. Axially outwardly of face 45, the impeller is formed on opposite sides with coextensive annular parallel smooth surfaces 47 and 48 that lie at right angles to axis A—A.

The outer side of impeller 39 is a flat smooth face 49 in engagement with the flat smooth internal face 51 of casing part 13 in a plane perpendicular to axis A—A. This limits axial movement of the impeller in the other direction.

As shown in FIGS. 4–6, impeller face 49 is formed with a series of axially open radial surface grooves 52 that distribute differential lubricant from space 37 to the interface between the impeller and case at 49, 51. In practice, these grooves are four in number and about .03" deep.

The peripheral shape of the impeller will be described in its relation to the housing 41.

Housing 41 of the retardation device comprises opposed annular side members 53 and 65 (FIG. 1) secured together by a series of screws 55. One or both members may be cup-shaped to define the space 40 therebetween for accommodating the impeller and containing the plastic elastic material 42.

In the illustrated embodiment, member 54 is cup-shaped, having an axially facing internal recess 56 defined by a flat radial face 57 and a surrounding cylindrical surface 58. Recess 56 is surrounded at the inner side of member 54 by a flat rim surface 59 having a series of threaded holes 61. Housing member 53 is essentially a flat ring having on its inner side an annular smooth flat surface 62 for tight abutment with surface 59. A series of countersunk holes 63 are provided in member 53 for receiving screws 55 threaded into holes 61. Member 54 is internally shouldered at 65 to mount a resilient O-ring 66 that is compressed to seal the joint between the housing members when screws 55 are tight.

Surface 62 preferably extends inwardly to provide an annular smooth face 67 parallel to and opposite face 57 on the other member, and these housing faces 57 and 62 are in smooth engagement with the opposed impeller faces 47 and 48 respectively over relatively wide annular areas wherein the housing faces are formed with annular grooves 68 and 69 containing resilient sealing O-rings 71 and 72 compressed by engagement with the respective impeller side faces.

Thus housing 41 is mounted about impeller 39 within the differential space 37 with its opposite sides in slidable sealing engagement with the impeller. The outer sides of housing 41 have mainly good clearance with the inner surfaces of space 37, except for the peripheral engagement of housing 41 with the case 11 which will be described.

Referring now to FIG. 2, the aligned cylindrical recess surfaces 32 and 36 are formed with a circumferentially spaced series of similar inwardly opening arcuate recesses 73, and the outer periphery of housing 41 is formed with a matching number of rounded projections 74 extending into recesses 73. This construction prevents any material relative rotation between housing 41 and case 11. These projections can be formed on either or both housing members 53 and 54 usually both.

Impeller 39, see FIGS. 3–6, is preferably of generally rectangular contour having flat chordal peripheral surfaces 75 of equal length joined by circular arc surfaces 76 of equal length. The arcuate surfaces 76 have a common radius slightly less than cylindrical surface 58 of housing 41 so that circumferentially spaced bodies of the plastic elastic material 42 are provided therebetween. Material 42 thus occupies all of the space 40 within the housing 41 around the impeller radially outwardly of seal rings 71 and 72.

As shown in FIG. 1, the opposite sides 77 and 78 of the impeller inwardly of arcuate surface 76 are inclined to converge outwardy toward surfaces 76. This insures the effective projections of lobes 79 on the impeller have considerable areas of added shear surface resistance are provided to complement the shear resistance at the bodies of material 81 between the projections, to restrain relative rotation of the housing 38 and case 11.

The material 42 occupying space 40 between housing 38 and impeller 39 is preferably the composition of matter known as silicone putty, which essentially comprises dimethyl silicone oil suitably treated with a boron compound to produce a product having the required elasticity and plasticity. Properties of this composition and modes of making it are disclosed in U.S. Letters Patent No. 2,541,851 to which reference is made for needed further information.

This elastic plastic material 42 has the property of providing a good surface layer bond with relatively smooth metal surfaces, and it resists relative movement between the metal housing 38 and impeller 39. This resistance, due to the special properties of the material, provides considerable opposition to relatively slow relative movements between the housing and impeller during which the material layers at the metal surfaces undergo shear. Should there be a sudden increase in speed of relative movement between the impeller and housing, as when a wheel loses traction with the ground, the material 42 will act like a solid elastic body and more strongly elastically oppose such relative movement, but should the shock of such sudden realtive movement be excessive the material will permit sufficient immediate relative movement between the housing and impeller to avoid mechanical failures in the gears or shafts.

For purposes of defining this invention therefore the preferred elastic plastic material 42 will be referred to as silicone putty, it being understood that it will be composed to meet the viscosity and other requirements of particular installations.

In operation of the invention therefore, the differentially casing 11 is rotated about axis A—A. During normal traction conditions where the wheels at the ends of shafts 29 and 31 have good tractive contact with the ground the entire differential mechanism rotates as a unit, there is no relative rotation between impeller 39 and housing 41 and drive torque is equally distributed to shafts 29 and 31.

Should the wheel connected to axle 31 lose traction, more torque will be diverted to shaft 31 which will tend to rotate faster than case 11. This tendency of shaft 31 to increase speed will be resisted by the retardation device 38, more specifically by the resistance of the elastic plastic material 42 to rotation of impeller 39, and this will insure that at least some of the torque will continue to be supplied to the other shaft 29 and thereby maintain a drive condition for the vehicle.

Should the wheel connected to axle shaft 29 lose traction, that shaft will tend to overspeed thereby tending to rotate side gear 27 faster, but this faster rotation of side gear is resisted because of its connection through pinion gears 26 and side gear 28 to retardation device 38, so that at least some torque will continue to be supplied to shaft 31 and thereby maintain a drive condition. The material 42 is relatively inert and non-volatile and does not change its properties within the temperatures normally encountered in automotive drive differentials.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a drive assembly of the type wherein a differential carrier is rotatably mounted and supports relatively rotatable differentially connected driven output members, the provision of an impeller rotatable with one of said members, an annular housing peripherally enveloping said impeller said impeller and housing having slidable fluid tight sealed engagement in parallel flat annular surface areas at oppisite sides of said impeller fluid tight seal means between the housing and impeller at said areas, elastic plastic material in said housing radially outwardly of said seal means for resisting relative movement between said housing and said impeller, and means non-rotatably connecting said housing to said carrier in the assembly.

2. In the drive assembly defined in claim 1, said material being silicone putty.

3. In the drive assembly defined in claim 1, said impeller means being a radially projecting element having concentric annular flat parallel surface areas near its outer periphery and said housing being generally U-shaped in cross section with parallel internal flat concentric annular surface areas having sliding sealing engagement with said parallel surface areas of said element.

4. In the drive assembly defined in claim 3, said element being disposed within the carrier and having at one side a flat face engaging a coextensive flat internal surface of the carrier, said element being formed on said face with a plurality of laterally open radial grooves open at their outer ends into a lubricant space within said carrier.

5. In the drive assembly defined in claim 1, said housing having a plurality of peripheral projections extending into corresponding recesses in said carrier to comprise said means for non-rotatably connecting the housing to said carrier.

6. In the drive assembly defined in claim 1, said impeller comprising a member fixed to said one output member and having radially projecting circumferentially spaced lobes within the housing so that the material within said housing is effectively separated into circumferentially spaced portions disposed between adjacent lobes.

7. In the drive assembly defined in claim 6, said lobes being curved at their outer ends to correspond with the shape of said housing and being interconnected by chordal surfaces along the periphery of said element.

8. In the drive assembly defined in claim 6, said lobes having diverging side walls within said housing.

9. In a drive assembly of the type wherein a differential carrier is rotatably mounted and supports relatively rotatable differentially connected driven output members, the provision of an impeller rotatable with one of said members, circumferentially spaced radially projecting lobes on the outer periphery of said impeller, an annular housing peripherally enveloping the lobed portion of said impeller and having slidable fluid tight sealed engagement with opposite sides of said impeller, elastic plastic material in said housing disposed wholly in the space between the outer periphery of said impeller and said housing, and means non-rotatably connecting said housing to said carrier in the assembly.

References Cited

UNITED STATES PATENTS

| 2,869,399 | 1/1959 | Miles | 74—711 |
| 2,883,884 | 4/1959 | Norton | 74—711 |
| 3,211,022 | 10/1965 | Anderson | 74—711 |
| 3,420,120 | 1/1969 | Burtner | 74—711 |

FOREIGN PATENTS 708,714 5/1954 Great Britain.

ARTHUR T. McKEON, Primary Examiner

PO-1050
(5/69)

UNITED STATES PATENT OFFICE
CERTIFICATE OF CORRECTION

Patent No. 3,534,633      Dated October 20, 1970

Inventor(s) STANLEY E. CHOCHOLEK

It is certified that error appears in the above-identified patent and that said Letters Patent are hereby corrected as shown below:

Column 3, line 12 - change "28" to -- 29 --.

Column 3, line 62 - change "65" to -- 54 --.

Column 4, line 41 - change "surfaces" to -- surface --.

Column 4, line 69 - change "realtive" to -- relative --.

Column 5, line 11 - after "axle" insert -- shaft --.

Column 5, line 48 - change "oppisite" to -- opposite --.

SIGNED AND
SEALED
MAR 16 1971

(SEAL)
Attest:

Edward M. Fletcher, Jr.
Attesting Officer

WILLIAM E. SCHUYLER, JR.
Commissioner of Patents